(12) United States Patent
Liberman

(10) Patent No.: US 6,760,014 B1
(45) Date of Patent: Jul. 6, 2004

(54) DISPLAY SYSTEM INCLUDING A MICROCIRCUIT CARD AND A READER

(75) Inventor: Georges Liberman, Montreuil-sous-Bois (FR)

(73) Assignee: Xiring (FR)

( * ) Notice: Subject to any disclaimer, the term of this patent is extended or adjusted under 35 U.S.C. 154(b) by 0 days.

(21) Appl. No.: 09/830,272

(22) PCT Filed: Oct. 19, 1999

(86) PCT No.: PCT/FR99/02540

§ 371 (c)(1),
(2), (4) Date: Apr. 25, 2001

(87) PCT Pub. No.: WO00/25252

PCT Pub. Date: May 4, 2000

(30) Foreign Application Priority Data

Oct. 26, 1998 (FR) .............................. 98 13375

(51) Int. Cl.$^7$ ................................. G09G 5/00
(52) U.S. Cl. ...................... 345/169; 235/375; 235/380; 902/23
(58) Field of Search ................................. 345/169, 204, 345/4; 235/375, 379, 380–382, 487, 492; 902/23–26; 463/44

(56) References Cited

U.S. PATENT DOCUMENTS

| | | | |
|---|---|---|---|
| 4,734,695 A | * | 3/1988 | Goldman |
| 4,843,223 A | | 6/1989 | Shino .......................... 235/487 |
| 6,021,944 A | * | 2/2000 | Arakaki |
| 6,164,531 A | * | 12/2000 | Harris et al. |

FOREIGN PATENT DOCUMENTS

| | | | |
|---|---|---|---|
| EP | 0196929 | | 10/1986 |
| FR | 2623678 | * | 5/1989 |
| WO | WO9810363 | | 3/1998 |

* cited by examiner

*Primary Examiner*—Regina Liang
(74) *Attorney, Agent, or Firm*—Rabin & Berdo, P.C.

(57) ABSTRACT

The invention concerns a display system comprising a plurality of chip cards (1) and a chip card reader (9), each chip card (1) comprising a software and a body (2) produced in synthetic material and wherein is provided a communication interface, the reader (9) comprising a box (10) and a display screen capable of displaying different messages, the box (10) being provided with a slot (12) capable of receiving a chip card (1), a communication interface being arranged in the slot for providing an electric connection between the reader (9) and each chip card (1). The chip card (1) comprises a display part (4) capable of being urged to co-operate by being superposed with the reader (9) display screen.

23 Claims, 2 Drawing Sheets

FIG_1
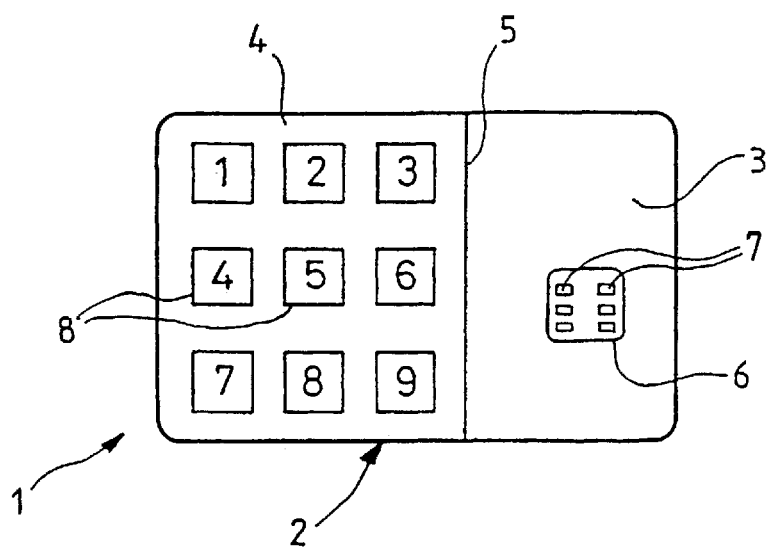
FIG_2
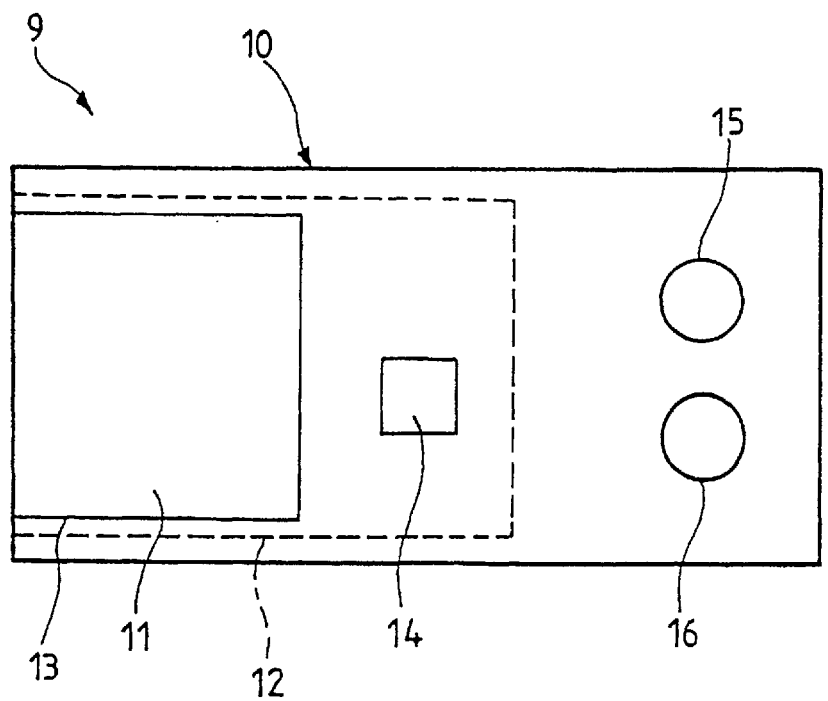

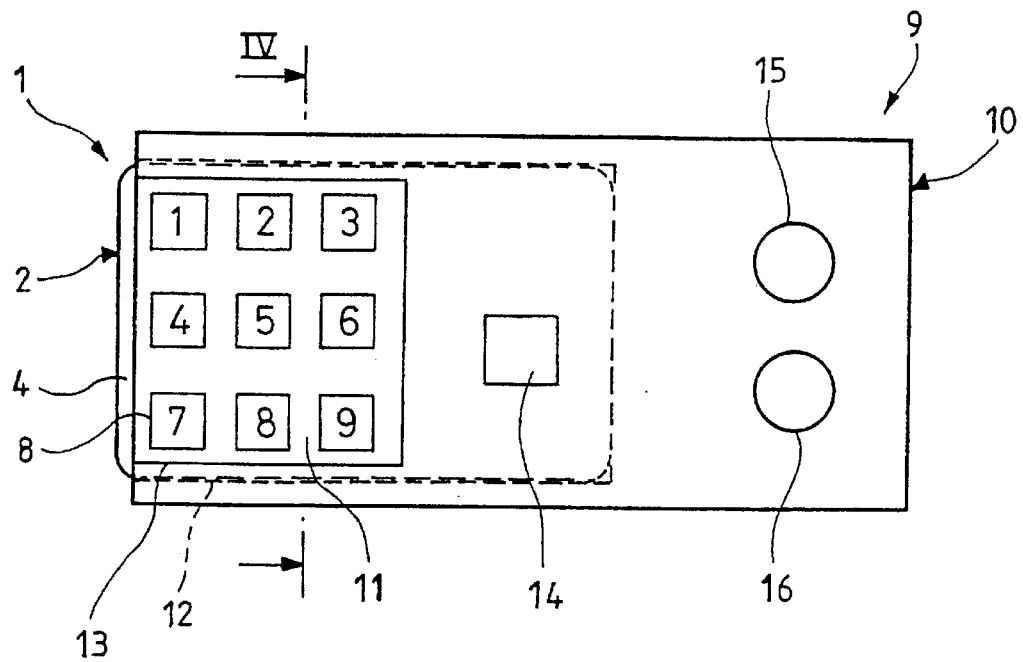
FIG_3
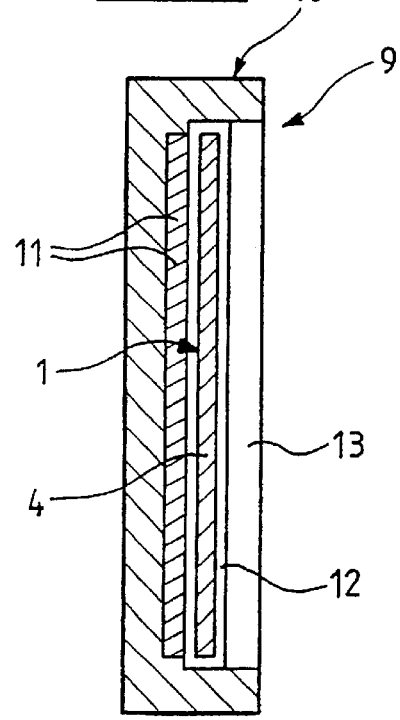
FIG_4

DISPLAY SYSTEM INCLUDING A MICROCIRCUIT CARD AND A READER

The present invention relates to the field of display systems that can be used for an electronic purse or for a game, in particular a game of chance, provided with a microcircuit card and a microcircuit card reader.

For a betting-type game, for example, the player first obtains a microcircuit card containing the software of the game. For more information on this type of game see French document 27 47 526 cited by way of reference.

An object of the present invention is to propose a system with a universal reader adapted to read different cards each of which is provided for a given use.

An object of the present invention is to propose a display system in which the display means are adapted to suit different kinds of use with satisfactory resolution and at very low cost.

The display system in accordance with the invention includes a plurality of microcircuit cards and a microcircuit card reader. Each microcircuit card contains software and has a body which is made from a synthetic material and in which a communication interface is provided. The reader includes a case and a display screen capable of displaying different messages. The case is provided with a slot adapted to receive a microcircuit card. A communication interface is disposed in the slot to enable an electrical connection between the reader and the microcircuit card. Each microcircuit card has a display part adapted to cooperate by superposition with the display screen of the reader.

The display part of each card is advantageously fixed.

In one embodiment of the invention the reader is adapted to cooperate with cards having different display parts.

In one embodiment of the invention the display part of each card is transparent and adapted to be disposed over the display screen of the reader.

In another embodiment of the invention the display screen of the reader is transparent and the display part of each card is adapted to be disposed under the display screen of the reader.

The reader advantageously includes control means for the display screen.

In one embodiment of the invention the reader includes means for transmitting displayed information.

In one embodiment of the invention the information transmission means include a piezo-electric vibrator adapted to transmit information in the form of an acoustical bar-code.

The invention also provides a microcircuit card reader for a system as described hereinabove.

The invention further provides a microcircuit card containing software and having a body which is made from a synthetic material and in which a communication interface is provided. The microcircuit card includes a display part adapted to cooperate by superposition with the display screen of a microcircuit card reader of the type including a case and a display screen capable of displaying different messages, the case is provided with a slot adapted to receive a microcircuit card, and a communication interface is disposed in the slot to provide an electrical connection between the reader and the microcircuit card.

Thus the user acquires a single reader that is not specifically dedicated to one use, for example a game or a bank account, and a microcircuit card that is dedicated to one use. The display screen of the reader can merely modify the brightness of a particular area of the screen so that it appears lighter or darker. The user sees the superposition of this particular area of the screen and a corresponding area of the display part of the microcircuit card on which a given sign is shown, for example a number, which is therefore contrasted with the remainder of the display and is so brought to the attention of the user. The display part of the microcircuit card includes information necessary for using it, such as a grid that can be etched, printed or formed by any other low-cost means.

A display system is provided including a universal and economical reader associated with a dedicated microcircuit card whose memory contains the information needed for using it, for example the game software and the information necessary for controlling the display screen of the reader. Control of the display is of course programmed to correspond with the information present on the display part of the microcircuit card. Thus a user who has purchased a reader can consult different microcircuit cards, in particular a health card, telephone card, public transport card, loyalty card, electronic purse card, game card, access card, etc.

The present invention will be better understood and other advantages will become apparent on reading the following detailed description of one embodiment of the invention, which description is given by way of non-limiting example only and illustrated by the accompanying drawings, in which:

FIG. 1 is a plan view of a microcircuit card according to the invention;

FIG. 2 is a plan view of a reader according to the invention;

FIG. 3 is a plan view of a system combining the reader and the microcircuit card; and FIG. 4 is a view to a larger scale and in section taken along the line IV—IV in FIG. 3.

As can be seen in FIG. 1, the microcircuit card 1 has a body 2 with an opaque part 3 and a transparent display part 4. The body 2 can be made from a flexible synthetic material and has standardised dimensions, its thickness being very small compared to its length and its width. The boundary between the opaque part 3 and the display part 4 is a line 5 parallel to the shorter side of the card, the display part 4 being slightly larger than the opaque part 3. In the opaque part 3 there is a communication interface 6 in the form of conductive metallised areas 7 electrically connected to a memory, not shown, contained in the card 1 and enabling the card to communicate with other units.

The display part 4 comprises nine squares 8 disposed in three rows of three and numbered 1 to 9. The contours of the squares and the numbers are opaque and are formed on the transparent part by a marking method such as printing, screenprinting, etc. Clearly the markings on the display part 4 depend on the use for which the card is intended. In uses other than that shown, different numbers could be marked, for example the numbers 1 to 49, with or without a frame, or letters, signs or any other graphical representation. The numbers could equally be disposed perpendicularly to the disposition shown here, i.e. with the row of numbers 1 to 3 parallel to the width. Finally, opaque and transparent areas arranged differently could be used. The body 2 of the microcircuit card 1 could even be entirely transparent except for the interface 6.

It must be understood that the display part 4 is an information support area intended to be read by associating the microcircuit card 1 with a reader that is described below. The opaque area 3 can advantageously support information such as instructions for use or advertising, but has no active role in association with display means of the reader.

The reader 9 shown in FIGS. 2 to 4 includes a parallelepiped-shaped case 10 which is made of a synthetic material, for example, and a display screen 11, for example an LCD screen. Inside the case 10 is a control unit, for example a 4-bit microprocessor, not shown, for controlling the display on the screen 11. The case 10 has a slot 12 to receive a microcircuit card 1. The slot 12 opens onto one of the smaller ends 10a of the case 10 and its depth is such that the communication interface 6 and the display part 4 of a card 1 are entirely inside the slot 12 after inserting the microcircuit card 1.

The screen 11 is disposed under the slot 12 so that it is under the card 1 when inserted. The case 10 also includes an opening 13 extending from its top face 10b and connected to the slot 12 in line with the screen 11, the opening 13 opening onto the side 10a. Accordingly, in the absence of a microcircuit card, the screen 11 at the bottom of the opening 13 is directly visible to the user. After inserting the microcircuit card 1 the screen 11 is under the transparent display part 4.

Near the bottom of the slot 12 is a communication interface 14 adapted to cooperate with the interface 6 of the microcircuit card 1. The communication interface 14 can take the form of flexible metal fingers adapted to come into contact with the areas 7 of the interface 6. The communication interface 14 is connected to the control unit of the reader 9.

The reader 9 also has two control buttons 15 and 16 that also communicate with the control unit. For example, the button 15 can be used to move a particular area that is lighter or darker than the remainder of the screen 11, that particular area moving into another sector of the screen 11 each time that the button 15 is pressed. The button 16 can be used to confirm the choice made by the button 15. Alternatively, the reader 9 can be provided with a control keypad or with directional buttons for moving said area.

The card is inserted by offering up the interface 6 to the inlet of the slot 12 and then sliding it longitudinally towards the back of the slot 12. The transparent display part 4 is then over the display screen 11, in other words between the display screen 11 and the eye of the user. The communication interfaces 6 and 14 are in mutual contact. The control unit can then read the memory of the card 1, which provides it with the necessary information relating to the nature of the use and the areas to be lit or not on the display screen 11.

FIG. 3 shows that the digit 1 is contrasted on the display when the area of the screen 11 under the digit 1 marked on the transparent display part 4 of the microcircuit card 1 is contrasted with the other areas of the screen 11. It is therefore clear that the display screen 11 provides means for illuminating or contrasting the display part 4 of the microcircuit card.

Because the reader 9 does not store information relating to use, it does not need any memory, or can have a memory of very small capacity, which is therefore of very low cost. The microcircuit card 1 stores information relating to a single use so that the card memory is of relatively small size and of equally low cost, which in the case of a game avoids the user having to pay for a costly multigame card when it is very frequently the case that the user is interested in only one game. The user therefore has to support only the cost relating to the use that is of interest.

When the user has made their play or placed their bet by means of the buttons 15 and 16, the control unit of the reader 9 writes the chosen play into the memory of the microcircuit card 1. The user then takes only the microcircuit card 1 to a trader, for example a tobacconist, who has the necessary equipment and validates the play by reading the microcircuit card 1 and transferring the play to the data processing system of the organiser of the game or the bet.

Alternatively, there can be provision for acoustical transmission, for example by telephone, using a piezoelectric vibrator in the reader 9 to transmit acoustical information relating to the play validated by the user, for example in the form of an acoustic bar-code.

In the case of an electronic purse, the reader can be held by the user, for example to consult the available amount, or by the trader from whom a purchase is made. Of course, the display system can be adapted for other kinds of use. Accordingly, with a health card, the social security number, prescriptions and diagnoses can be shown. There is thus assured a display part of the card, the software stored in the card and the screen of the reader managed by the microprocessor of the reader in accordance with instructions in the software.

The invention provides an economical display system avoiding the user having to purchase means they do not wish to use, such as additional plays, and enabling easy reading of the display thanks to the cooperation of fixed display means, i.e. the microcircuit card 1, and variable display means, i.e. the screen 11 of the reader 9. A reversed relative position of the two display means could of course be provided, with a transparent or semi-transparent screen 11 disposed over the display part 4 of the microcircuit card 1.

What is claimed is:

1. A display system including a plurality of microcircuit cards (1) and a microcircuit card reader (9), in which system each microcircuit card (1) contains software and has a body (2) made from a synthetic material and in which a communication interface (6) is provided, the reader (9) includes a case (10) and a display screen (11) for displaying different messages, the case is provided with a slot (12) adapted to receive any one of the microcircuit cards (1), and a communication interface (14) is disposed in the slot to enable an electrical connection between the reader and the microcircuit card, wherein each microcircuit card (1) has a display part (4) provided with an information support area and adapted to cooperate by superposition with the display screen (11) of the reader.

2. A system according to claim 1, characterized in that the display part of each card is fixed by means of a marking process.

3. A system according to claim 2, characterized in that the reader is adapted to cooperate with cards having different display parts.

4. A system according to claim 2, characterized in that the display part (4) of each card is transparent and adapted to be disposed over the display screen (11) of the reader.

5. A system according to claim 2, characterized in that the display screen of the reader is transparent and the display part of each card is adapted to be disposed under the display screen of the reader.

6. A system according to claim 2, characterized in that the reader (9) includes control means (15, 16) for the display screen.

7. A system according to claim 2, characterized in that the reader includes means for transmitting displayed information.

8. A system according to claim 2, wherein the marking process is etching or printing or screenprinting.

9. A system according to claim 1, characterized in that the reader is adapted to cooperate with cards having different display parts.

10. A system according to claim 9, characterized in that the display part (4) of each card is transparent and adapted to be disposed over the display screen (11) of the reader.

11. A system according to claim 9, characterized in that the display screen of the reader is transparent and the display part of each card is adapted to be disposed under the display screen of the reader.

12. A system according to claim 9, characterized in that the reader (9) includes control means (15, 16) for the display screen.

13. A system according to claim 9, characterized in that the reader includes means for transmitting displayed information.

14. A system according to claim 1, characterized in that the display part (4) of each card is transparent and adapted to be disposed over the display screen (11) of the reader.

15. A system according to claim 14, characterized in that the reader includes means for transmitting displayed information.

16. A system according to claim 1, characterized in that the display screen of the reader is transparent and the display part of each card is adapted to be disposed under the display screen of the reader.

17. A system according to claim 1, characterized in that the reader (9) includes control means (15, 16) for the display screen.

18. A system according to claim 1, characterized in that the reader includes means for transmitting displayed information.

19. A system according to claim 18, characterized in that the information transmission means include a piezoelectric vibrator adapted to transmit information in the form of an acoustical bar-code.

20. A microcircuit card reader (9), each card being of the type comprising a microcircuit containing software, and a body (2) made of synthetic material and in which a communication interface (6) is provided, the reader (9) comprising a case (10) and a display screen (11) capable of displaying different messages, the case being provided with a slot (12) adapted to receive a microcircuit card (1), a communication interface (14) being disposed in the slot in order to enable electrical connection between the reader and the microcircuit wherein the case (10) comprises an opening (13) joining the slot (12) in line with the display screen so that each microcircuit card (1) is adapted to cooperate by superposition with the display screen (11).

21. A microcircuit card (1) containing software and having a body (2), which is made from a synthetic material and in which a communication interface (6) is provided, wherein it includes a display part (4) provided with an information support area and adapted to cooperate by superposition with the display screen (11) of a microcircuit card reader (9) of the type including a case (10) and a display screen (11) capable of displaying different messages, the case is provided with a slot (12) adapted to receive a microcircuit card, and a communication interface (14) is disposed in the slot to provide an electrical connection between the reader and the microcircuit card.

22. A display system, including
- a plurality of microcircuit cards, each microcircuit card having
  - a body made from a synthetic material, and
  - a card communication interface supported by the body,
  - the microcircuit card containing software and having a display part provided with an information support area; and
- a microcircuit card reader, including
  - a case having a slot, adapted to receive any one of the microcircuit cards,
  - a reader communication interface supported by the case so as to be exposed in the slot for electrical connection between the reader and the microcircuit card, through the card communication interface, and
  - a display screen for displaying different messages, supported by the case so as to be exposed outside of the slot, wherein the display part of each microcircuit card includes an information support area adapted to cooperate by superposition with the display screen when received in the slot.

23. The system of claim 22, wherein the information support area includes indicia imprinted thereon, the indicia superimposed over the display screen and exposed outside of the slot.

* * * * *